Figure 1:
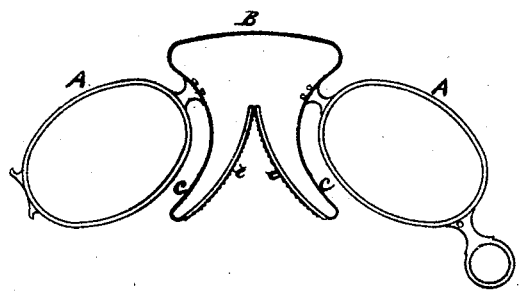

L. A. BERTELING.
Eye-Glasses.

No. 146,982. Patented Feb. 3, 1874.

Witnesses
John L. Borne
C. M. Richardson

Louis A. Berteling
By Dewey & Co.
Att'ys

UNITED STATES PATENT OFFICE.

LOUIS A. BERTELING, OF SAN FRANCISCO, CALIFORNIA.

IMPROVEMENT IN EYEGLASSES.

Specification forming part of Letters Patent No. 146,982, dated February 3, 1874; application filed October 28, 1873.

*To all whom it may concern:*

Be it known that I, LOUIS A. BERTELING, of the city and county of San Francisco, State of California, have invented certain new and useful Improvements in Eyeglasses; and I do hereby declare the following description and accompanying drawings are sufficient to enable any person skilled in the art or science to which it most nearly appertains to make and use my said invention or improvement without further invention or experiment.

My invention relates to an improved nose-clamp for eyeglasses.

As heretofore constructed, the pressure of the spring acting upon the solid clamps of the glasses had a tendency to force the clamps upward, and loosen their gripe upon the bridge of the nose. This was the case, whether the frames themselves served as clamps, or whether an especial clamp was provided.

My improvement consists in providing spring-clamps whose elasticity permits them to yield to the pressure of the bow or connecting spring, and thereby adjust themselves to the shape or conformation of the bridge of the nose, and, while the pressure required to hold them firmly against the sides of the nose is less than that required for the ordinary clamps, there will be no liability whatever of their being detached or loosened.

In the drawings accompanying this specification, A A are the two frames of an eyeglass, in which the lenses are held. $b$ is the bow-spring, which unites the two frames together, and which serves, when the frames are separated, to press them together against the opposite sides of the nose. My improvement consists in extending the ends of this spring downward to the desired distance below their points of attachment to the frames, as at $c$, and then bending them upon themselves in an upward direction, so that their extremities almost meet midway between the two frames. The extensions $c$ are curved outward, while the extremities are curved inward, thus giving the lower portion of the spring the shape of an inverted M. To the upward bent extremities of the spring I then secure a convex shoe or block, $e$, which may be made of india-rubber or other suitable substance or material, the convex face of which may be corrugated, if desired. It is only necessary that the extremities of the spring should extend upward far enough to provide a fastening for the shoes $e$.

The shoes or clamps, being independent of each other, will separate when pressed down upon the bridge of the nose, and thus clamp it upon opposite sides, while the spring-extensions $c$ serve to press them together from the lower end. The pressure upon the clamps is thus equalized, so that there will be no danger of their slipping off of the nose.

Another advantage which I gain by this arrangement is the better adjustment of the glasses in front of the eyes. The clamps being applied below the frames and being close together, the outward pressure will bring them nearer in line with each other and more directly in line with the sight, thus rendering them more comfortable and better adapted to the eyes.

Figure 2:
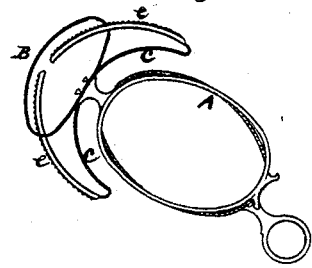

The eyeglasses are folded in the ordinary manner, and when thus folded the clamps will be neatly disposed at one end in the form of a semicircle, as shown at Fig. 2.

Having thus described my invention, what I claim, and desire to secure by Letters Patent, is—

The frames A A, having the bow-spring $b$ extended downward at each end, as at $c$, and then bent upward toward each other, and having the clamps, shoes, or blocks $e$ secured to its extremities, in the manner and for the purpose specified.

In witness whereof I have hereunto set my hand and seal.

LOUIS A. BERTELING. [L. S.]

Witnesses:
 JOHN L. BOONE,
 C. M. RICHARDSON.